(12) United States Patent
Fieau et al.

(10) Patent No.: US 11,349,750 B2
(45) Date of Patent: May 31, 2022

(54) METHOD FOR DYNAMICALLY MANAGING COMMUNICATION PATHWAYS BETWEEN ROUTERS DEPENDING ON APPLICATION REQUIREMENT

(71) Applicant: Orange, Paris (FR)

(72) Inventors: Frederic Fieau, Paris (FR); Gael Fromentoux, Pleumeur Bodou (FR); Arnaud Braud, Lannion (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/084,918

(22) PCT Filed: Mar. 13, 2017

(86) PCT No.: PCT/FR2017/050565
§ 371 (c)(1),
(2) Date: Sep. 13, 2018

(87) PCT Pub. No.: WO2017/158272
PCT Pub. Date: Sep. 21, 2017

(65) Prior Publication Data
US 2019/0081889 A1    Mar. 14, 2019

(30) Foreign Application Priority Data
Mar. 15, 2016   (FR) ...................................... 1652145

(51) Int. Cl.
*H04L 45/30* (2022.01)
*H04L 45/00* (2022.01)
(Continued)

(52) U.S. Cl.
CPC .............. *H04L 45/30* (2013.01); *H04L 45/02* (2013.01); *H04L 45/22* (2013.01); *H04L 45/24* (2013.01); *H04L 65/1069* (2013.01)

(58) Field of Classification Search
CPC ....... H04L 12/66; H04L 47/70; H04L 47/825; H04L 45/02; H04L 45/22; H04L 45/24; H04L 45/30; H04L 65/1069
See application file for complete search history.

(56) References Cited

U.S. PATENT DOCUMENTS 6,910,074 B1 * 6/2005 Amin ................... H04L 12/2856
709/227
11,171,999 B2 * 11/2021 Leung ................. H04L 65/1069
(Continued)

FOREIGN PATENT DOCUMENTS

WO    2007047936 A1    4/2007

OTHER PUBLICATIONS

Written Opinion for the International Application No. PCT/FR2017/050565.

*Primary Examiner* — Melanie Jagannathan
(74) *Attorney, Agent, or Firm* — Haverstock & Owens, A Law Corporation

(57) ABSTRACT

The invention relates to a method for managing at least one communication pathway between a first router (30) and a second router (130), being characterised in that it comprises the following steps: establishing a session (40) between a terminal (10) connected to the first router (30) and a remote piece of equipment (70) connected to the second router (130); analysing at least one characteristic of the session (40) in order to determine whether said session (40) is collaborative and if this is the case: receiving at least one signalling message containing at least one piece of information relating to a characteristic of said session (40); determining parameters of the connection between said routers (30, 130) depending on the at least one obtained piece of information; modifying the at least one communication pathway (80) between said routers (30, 130), depending on the determined connection parameters; and transmit-
(Continued)

Figure 1:
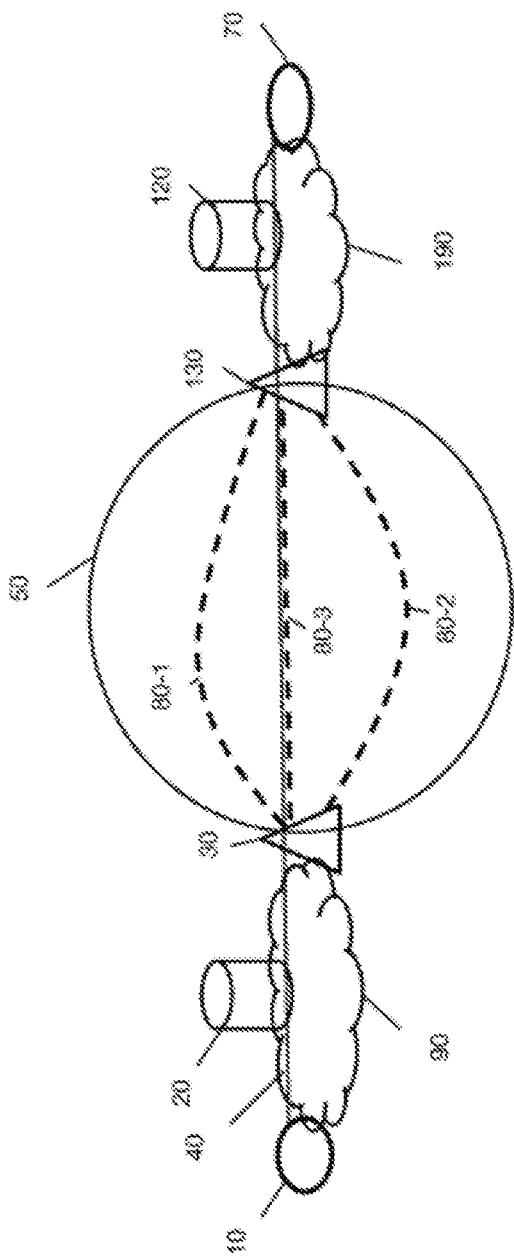

ting the data of said session (40) over said modified communication pathway (80).

20 Claims, 4 Drawing Sheets

(51) Int. Cl.
*H04L 45/24* (2022.01)
*H04L 45/02* (2022.01)
*H04L 65/1069* (2022.01)

(56) References Cited

U.S. PATENT DOCUMENTS

| | | | | |
|---|---|---|---|---|
| 2002/0120749 | A1* | 8/2002 | Widegren | H04L 65/1069 709/227 |
| 2007/0002832 | A1* | 1/2007 | Sylvain | H04W 76/12 370/352 |
| 2009/0310614 | A1 | 12/2009 | Krishnamurthy et al. | |
| 2010/0036953 | A1* | 2/2010 | Bogovic | H04L 65/1006 709/226 |
| 2010/0150003 | A1* | 6/2010 | Andreasen | H04L 43/08 370/252 |
| 2010/0287285 | A1* | 11/2010 | Castellanos Zamora | H04L 65/1069 709/227 |
| 2010/0312834 | A1* | 12/2010 | Doken | H04L 65/1093 709/205 |
| 2011/0053571 | A1* | 3/2011 | Mahdi | H04L 65/1069 455/414.1 |
| 2011/0295954 | A1* | 12/2011 | Kowalewski | H04L 12/1827 709/205 |
| 2014/0075038 | A1* | 3/2014 | Kato | H04L 65/1006 709/228 |
| 2015/0016249 | A1 | 1/2015 | Mukundan et al. | |
| 2015/0092551 | A1 | 4/2015 | Moisand et al. | |
| 2015/0113164 | A1 | 4/2015 | Butler et al. | |
| 2015/0215365 | A1* | 7/2015 | Shaffer | H04L 65/80 370/252 |
| 2016/0044125 | A1* | 2/2016 | Hardin | H04L 67/2823 709/219 |

\* cited by examiner

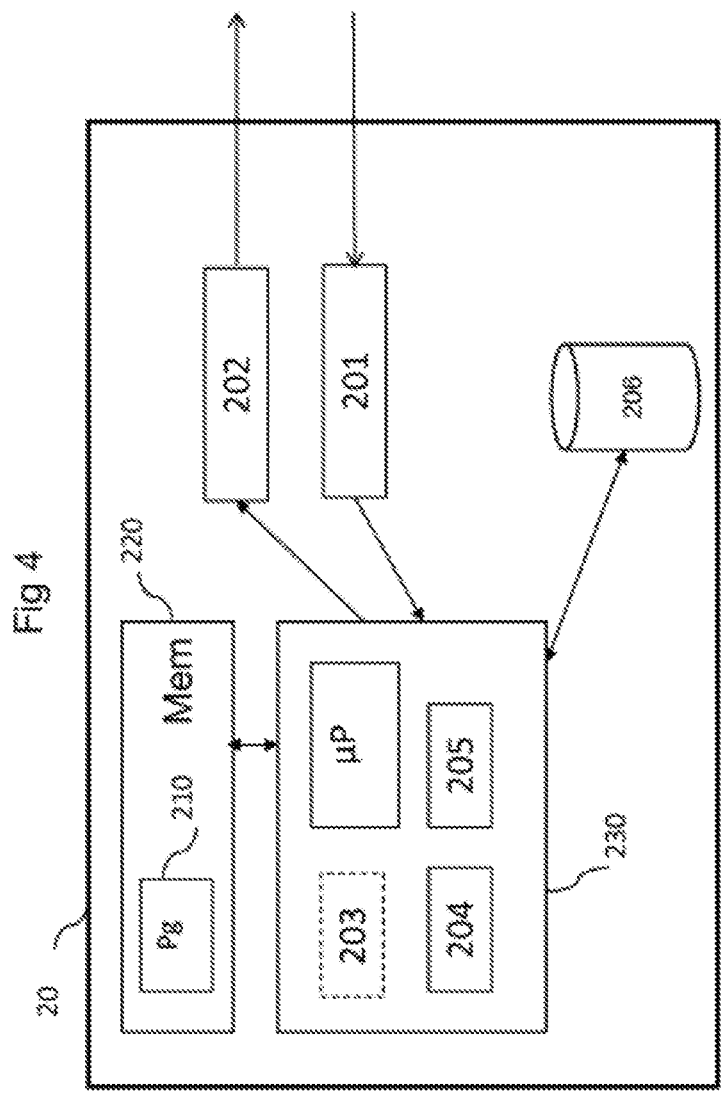

METHOD FOR DYNAMICALLY MANAGING COMMUNICATION PATHWAYS BETWEEN ROUTERS DEPENDING ON APPLICATION REQUIREMENT

1. Field of the Invention

The invention lies in the field of packet-based data transmission networks, and relates more particularly to the selection and adaptation of communication paths as a function of the requirements of the applications generating the data.

2. Prior Art

Network operators and content providers are seeking ever more to collaborate in order to better correlate the requirements of applications and the capabilities of networks. Operators see therein a means of monetizing the transport and of optimizing the delivery of contents through their networks, and application providers a means of adapting data sessions to their requirements. For operators, the objective of these interactions is also to better manage their networks with respect to traffic fluctuations and especially traffic growth. On the basis of the information collected on the network and of the optimization solutions which match the needs of applications and the capabilities of networks, content service providers wish to improve the quality of service perceived by the clients of their services.

Operators are seeking ever more to collaborate and to weave partnerships with content service providers. Thus, new mechanisms or protocols making it possible to connect network operators and content service providers are undergoing specification.

Technical solutions based on MTG (Mobile Throughput Guidance), Webpush or SPUD (Session Protocol Underneath Datagrams) are so many solutions making it possible to implement a collaboration between the players of the Internet, among which are operators and content providers.

By way of example, the SPUD protocol is undergoing specification at the IETF. The expression of requirements, related to this protocol, is described in the document https://tools.ietf.org/html/draft-trammell-spud-req-01 (19 Oct. 2015). The object of this protocol is to broadcast messages, also called "advices", transporting recommendations related both to "services" and to the "network". These messages will for example be used to activate certain functions in the appliances of the network. It is a so-called collaboration protocol allowing end appliances of client or server types to exchange "advices" with appliances of the network in order to adapt the behavior of these appliances to the constraints of the applications activated on the end appliances.

Moreover, operators deploy architectures based on tunnels, for example of MPLS LSP (MultiProtocol Label Switch—Label Switch Path) type, to convey their traffic within pooled networks, thus guaranteeing a certain leak-proofing of the flows as well as different quality-of-service policies, depending on the tunnels considered. Traffic engineering mechanisms can thus be used by operators to adapt the routing of the flows to constraints on bandwidth or on the availability of resources. These mechanisms are activated upon initialization of the session established between the terminal and the server or the remote appliance if this involves for example Machine-to-machine networks. For example, one way of adapting the establishment of tunnels in order to route a data flow is to use the DiffServ protocol indicating a service class characterizing the flow. This Diffsery field of the IP or EXP packet of the MPLS label is then used to route the traffic within the pooled network.

It should be noted that the characteristics of a flow may evolve in the course of an application session, with the consequence that the initially established tunnel is no longer optimal.

The collaboration techniques undergoing study or specification, among which those cited previously (SPUD, Webpush, MTG), are solutions allowing the applications to express requirements in terms of traffic processing. The intermediate appliances, by interpreting the requirements formulated by the applications, apply appropriate processings for example by adding or by modifying fields of the datagrams. However, these solutions do not make it possible to modify network architectures or options for routing the flows as a function of variation of parameters which are expressed by a content provider, for example of quality-of-service parameters evolving during a session.

One of the aims of the invention is to remedy these drawbacks of the prior art.

3. DISCLOSURE OF THE INVENTION

The invention improves the situation with a method for managing at least one communication path between a first router and a second router, comprising the following steps:
  establishment of a session between a terminal connected to the first router and a remote appliance connected to the second router
  analysis of at least one characteristic of the session to determine whether said session is collaborative and if such is the case:
  reception of at least one signaling message comprising at least one item of information relating to a characteristic of said session,
  determination of parameters of connection between said routers as a function of the at least one item of information obtained,
  modification of the at least one communication path between said routers as a function of the connection parameters determined,
  transmission of the data of said session in said modified communication path.

The establishment of a communications path between two routers, each of the routers being connected respectively to the terminal initiating the session and to the end appliance of the session, is today carried out on the basis of routing techniques or tunnels implemented as a function of criteria such as the resources available in the network, of bandwidth or of application constraints up till now expressed in fields of the IP protocol such as the Diffsery field. With the current techniques, it is not possible to update in a dynamic manner, that is to say for sessions already established between a terminal and the remote appliance, these communication paths to take account for example of variations of application requirements during a session, for example if an encoding variation impacts the capabilities of buffer memory placement and requires updating of the routing or of the tunnel, according to the technique employed by the operator, for the forwarding of the flows. According to the current technologies, the communication paths which can be established by implementing tunnels of diverse types, for example on the basis of MPLS technologies or by IP in IP encapsulations or those of GRE type or indeed by "source routing" type routing technologies, are established upon initialization of the session and are not modified during a session, including if the characteristics of the application session vary over time.

The invention proposes a method such that a terminal having established a session of application type with a remote appliance, for example a server or another terminal, informs a communication path end router of the new characteristics of the session so that this router maintains or updates the communication path in place, therefore the tunnel or the routing information, in such a way that the communication path is always adapted to the requirements of the applications. It might involve for example conveying the flows of the session on another tunnel that is better adapted to the new characteristics of the session, the new tunnel having quality-of-service characteristics allowing a forwarding of the data in accordance with the requirements of said session which are expressed in the signaling message transmitted by the terminal to the communication path management device. The remote appliance can also promulgate application requirements through at least one signaling message emitted to a communication path management device so as to update the communication path established between the router to which the remote appliance is connected and the router to which the terminal is connected.

Initially the session established between the terminal and the remote appliance is analyzed to determine whether the ongoing session can benefit from the method of dynamic management of the communication path. This determination is related to a policy of the operator and can be performed on the basis of the analysis of certain fields or characteristics of the session, among which are the service provider, the identity of the client, the type of browser, the type of terminal used by the client. The examples of fields cited hereinabove are not exhaustive and it is possible to consider any field characterizing a session between a terminal and a remote appliance.

Signaling messages including information describing the requirements of the terminal or of the end appliance for an ongoing session are dispatched respectively by the terminal and the remote appliance. These signaling messages are received by the communication path management device so that the latter analyses them. These signaling messages may in particular contain information describing the type of application supported by the session, the type of protocol, the location of the terminal and of the remote appliance, the type of encoding, the rate of placement in buffer memory. This list of information is not exhaustive and can be enriched with other parameters that may be analyzed by the communication path management device.

This signaling message transmitted by the terminal or the remote appliance makes it possible to qualify the characteristics of the application session and to determine on the basis of these characteristics the connection parameters of the communication path that are adapted to the application requirements. For example, the analysis may pertain to the type of application and the encoding rate and as a function of the information received with respect to this information type, the communication path management device determines which connection parameters must be transmitted to the communication path end router in such a way that it selects the communication path adapted to these connection parameters.

It is understood that the invention allows the setting up and dynamic updating of the communication path between two routers as a function of the evolution of parameters of sessions established between a terminal and a server.

By updating of the communication path it should be understood that a new communication path, for example a new tunnel, can be selected or else that a new communication path can be created, or indeed that an existing communication path is updated for example by modifying the parameters of this path.

According to a particular characteristic, the step of establishing the session of the management method comprises a step of analyzing said session for the selection of said first router to which the terminal connects. The parameters of the session initiated by the terminal upon startup of the service are analyzed so as to route the sessions to the appropriate router. The session parameters such as the session identifier, the source address of the terminal, the destination address of the remote appliance of the session can individually or in combination for example be taken into consideration for the choice of the router. According to a particular characteristic, the selection of a new end router during a session can intervene as a function of parameters of the session established between the terminal and the remote appliance. By way of example, a modification of the location of the terminal and therefore of the location item of information present in the flow of the session may make it necessary to select a different end router from that selected initially as a function of the parameters of the session.

According to another particular characteristic, the management method furthermore comprises a step of dispatching collaborative-session initialization messages to the terminal and the remote appliance if the session is collaborative.

In the case where the session is defined as eligible to the service for adaptation of the communication path between the first and the second router, subsequent to the analysis of the characteristics of the session, an initialization message is transmitted to the terminal that started up the session as well as to the remote server of the session. The object of this message is to invoke on the part of the terminal and of the remote appliance the dispatching of at least one signaling message comprising the requirements of the session. This message makes it possible to start up the process for adapting the communication path between the two routers as a function of the at least one item of information conveyed in the signaling messages. Thus the selected communication path is adapted and updated regularly as a function of the evolutions of the session parameters which are transmitted in the signaling messages.

Upon receipt of the initialization message, at least one initialization message is transmitted by the terminal. The server can also transmit at least one signaling message upon receipt of this initialization message.

According to another particular characteristic, the management method furthermore comprises a step of communication path selection from among previously established paths whose characteristics correspond to the connection parameters, as a function of said connection parameters.

When an existing communication path or tunnel responds to the connection parameters determined on the basis of the at least one item of information transmitted in the signaling message emitted by the terminal or the remote appliance, the latter is selected for the forwarding of the flows of the session for which at least one signaling message has been transmitted. The policy for selecting the communication path as a function of the session flow parameters is specific to the operator. The operator has the possibility of considering one or more connection parameters for selecting the communication path and it will be able for example to use a correspondence table making it possible to associate connection parameters such as are determined by the communication path management device with communication path characteristics. By way of example, several tunnels of IP/MPLS type may be instantiated by the end router with another end router, each having different quality-of-service characteristics and the tunnel whose characteristic is closest to the connection parameters in terms of quality of service will be selected for the forwarding of the data of the session considered.

According to another particular characteristic, the management method comprises a step of establishment of communication path with the characteristics corresponding to the connection parameters, in the case where no previously established path corresponds to said connection parameters.

In the case where no existing communication path exhibits characteristics that are sufficiently close to the connection parameters determined on the basis of the at least one item of information transmitted in at least one signaling message emitted by the terminal, a new communication path having the required characteristics is created by the end router. This new communication path will exhibit the characteristics responding to the parameters of the session and will be integrated into the base of the communication paths established so as to be able to be used for other sessions whose connection parameters would approach the characteristics of this newly created communication path. This might involve for example creating a new IP/MPLS tunnel having characteristics adapted to the parameters of connection between the routers of attachment of the terminal and of the end appliance of the session.

According to another particular characteristic, the management method furthermore comprises a step of multiplexing the data of said session with data of at least one other session in a communication path.

A communication path established between the first end router and the second end router is used to convey several sessions initiated by one or more terminals destined for one or more different end appliances. The choice of the communication path is made on the basis of connection parameters determined on the basis of the at least one item of information of a signaling message. In the case where the connection parameters determined are sufficiently close for data of several sessions to be transmitted on one and the same communication path, according to a particular characteristic the data of sessions are then multiplexed on this communication path, thus making it possible to reduce the number of communication paths between the end routers. The maximum number of sessions to be multiplexed and the necessity to create a new communication path if relevant is a decision pertaining to the network engineering specific to the operator.

According to another particular characteristic, the management method furthermore comprises a step of transmitting the data of said session on at least two communication paths.

If a given session may not be transmitted on a single communication path because of bandwidth problems or in order to optimize the transmission of the data of the session, the transmission of the data of one and the same session on several communication paths in parallel may be envisaged. During the reception of the connection parameters, the end router determines whether it is necessary to transmit the data of the session corresponding to the connection parameters received on a single or several communication paths.

The various aspects of the management method which have just been described can be implemented independently of one another or in combination with one another.

According to a second aspect, the invention relates to a communication path management device, deployed between the terminal and the first end router or between the remote appliance and the second end router, said device comprising
  an analyzer of at least one characteristic of session established between the terminal and the remote appliance so as to determine whether said session is collaborative
  a receiver of the signaling messages related to said session
  a module for determining the parameters of connection between said routers as a function of the at least one item of information obtained in at least one signaling message
  an emitter of the connection parameters to the communication path end router. The communication path management device is deployed during a session cutoff, for example in an intermediate appliance of router or "middlebox" type (firewall appliance, DPI (DeeP Packet Inspection . . . ) appliance, connected to the network connecting the terminal and the communication path end router or to the network connecting the remote appliance and the second end router. It should be noted that the communication path selection method relies on at least one communication path management device. This device analyses the characteristics of the ongoing sessions and determines on the basis of one or more of these characteristics whether these sessions are of collaborative type on the basis of at least one parameter of said session. It furthermore receives the signaling messages emitted by the terminal or the remote appliance for a given session and determines on the basis of at least one item of information of the signaling messages the connection parameters required between the end routers of the communication path so that the session is forwarded on the best adapted communication path. These connection parameters are thereafter transmitted to the communication path end router in such a way that it selects a communication path whose characteristics are adapted to the connection parameters.

According to a particular characteristic, the management device furthermore comprises a generator of collaborative-session initialization messages bound for the terminal and the remote appliance if said session is collaborative.

The communication path management device according to a particular characteristic integrates a module for emission of collaborative-session initialization message destined for the terminal and for the remote appliance of the session. When the communication path management device detects that a session is collaborative on the basis of the analysis of the characteristics of said session, it emits initialization messages to the terminal and the end device, thus indicating to them that the session is considered to be collaborative and they can emit signaling messages used to determine the connection parameters and therefore the communication path.

According to another particular characteristic, the management device is characterized in that it is embedded in a communication path end router. The communication path management device can be integrated into an end router of the communication path. The communication path management device being deployed between the terminal and the communication path end router, it can according to a particular characteristic be advantageously integrated into a communication path end router. In the case where the communication path end router is selected as a function of at least one session parameter, the device can be integrated into each of the routers liable to be selected. A second option consists in integrating the communication path management device into one of the path end routers to which the terminal will connect by default, the latter having the role of selecting the communication path that may furthermore involve the selection of another end router. By way of example, the end router may integrate a specific hardware or software analysis component integrating the various modules specific to the communication path management device such as previously described. The emission of the connection parameters to the end router consists in this case in transferring the information relating to the connection parameters from the analysis component to the function for selecting the communication path of the end router.

The invention also relates to a communication path management system comprising:
- at least one management device such as that which has just been described
- at least two communication path end routers comprising:
    - a database describing the communication paths established with other end routers and characteristics of said communication paths
    - a receiver of the connection parameters of a session between a terminal and a remote appliance emitted by the communication path management device
    - a module for selecting the communication path as a function of said connection parameters.

The invention also relates to a computer program comprising instructions for the implementation of the steps of the communication path management method which has just been described, when this program is executed by a processor.

This program can use any programming language, and be in the form of source code, object code, or of code intermediate between source code and object code, such as in a partially compiled form, or in any other desirable form.

The invention also envisages an information medium readable by a computer, and comprising instructions of a computer program such as is mentioned hereinabove.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded from a network of Internet type.

Alternatively, the information medium can be an integrated circuit in which the program is incorporated, the circuit being adapted to execute or to be used in the execution of the methods in question.

4. PRESENTATION OF THE FIGURES

Figure 2:
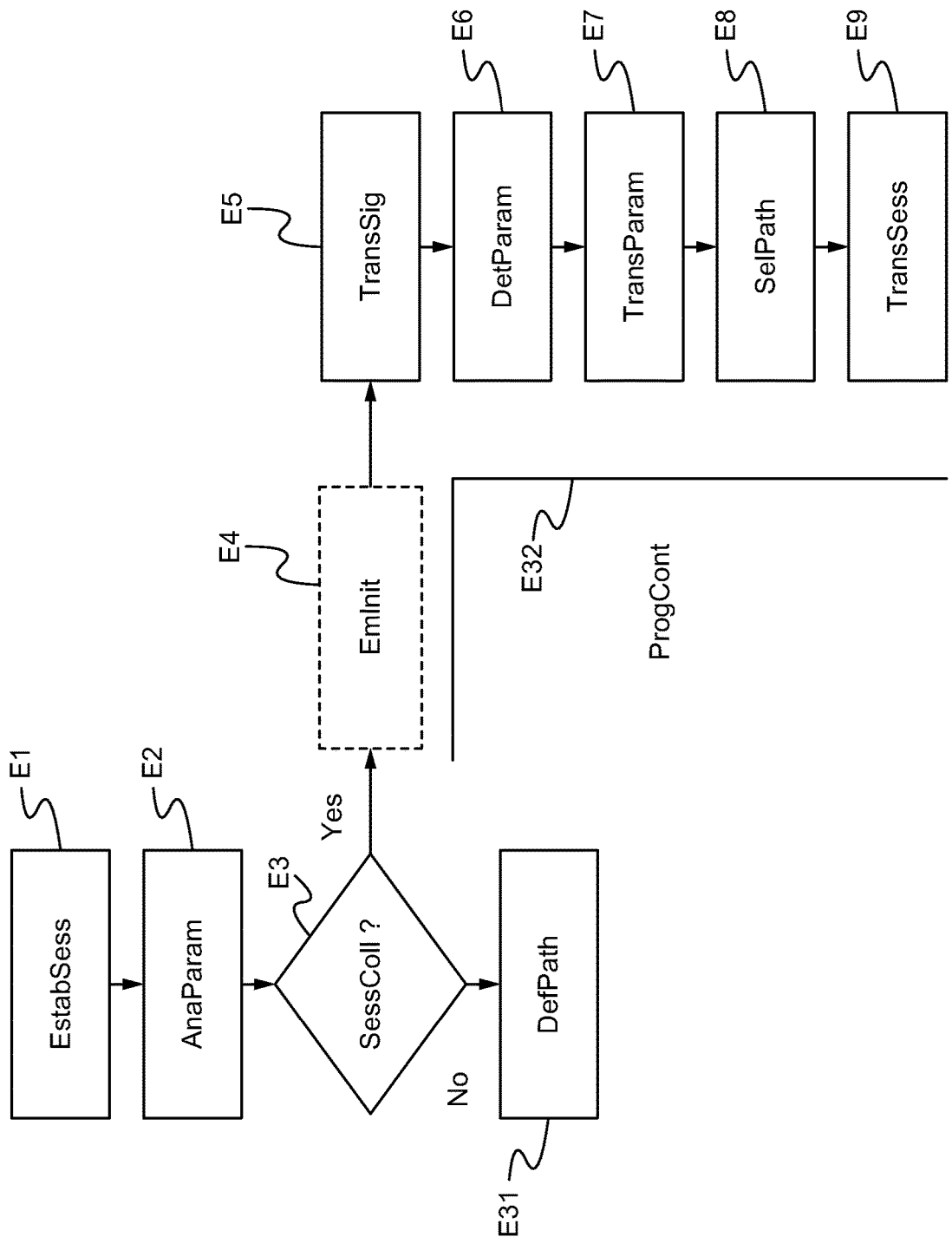
Figure 3:
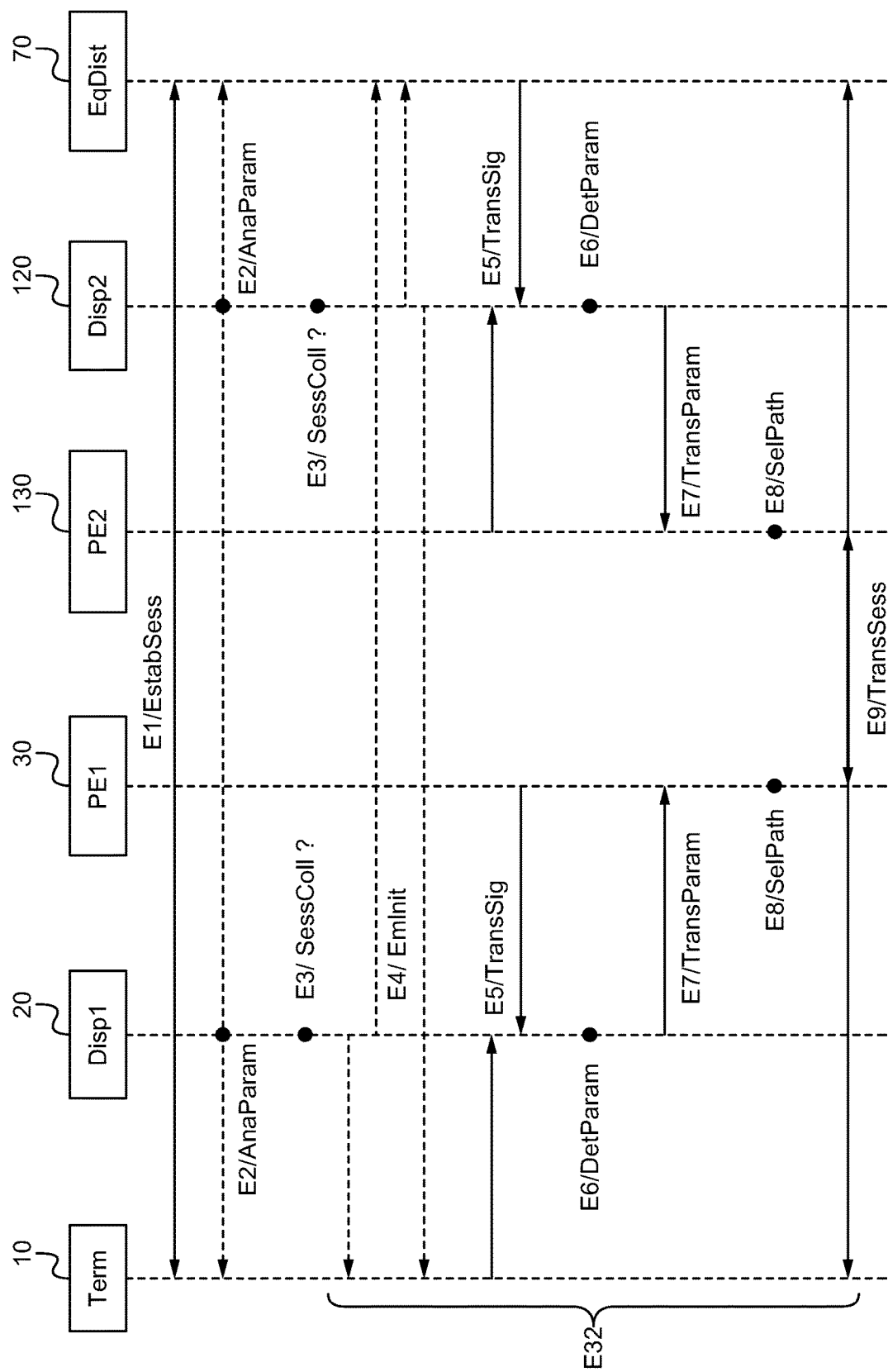

Other advantages and characteristics of the invention will become more clearly apparent on reading the following description of a particular embodiment of the invention, given by way of simple illustrative and nonlimiting example, and of the appended drawings, among which:

FIG. 1 presents in a schematic manner a communication path dynamic selection system involving a terminal and a remote appliance, two path management devices, two communication path end routers, an interconnection network composed of several communication paths according to the invention, FIG. 2 describes the various steps of the management method according to one aspect of the invention, FIG. 3 represents the various messages exchanged between the various entities in a particular embodiment of the management method according to the invention, FIG. 4 represents a structure of a communication path management device, according to a particular embodiment of the invention.

5. DETAILED DESCRIPTION OF AT LEAST ONE EMBODIMENT OF THE INVENTION

In the subsequent description, will be described an embodiment of the method for managing communication paths according to the invention. By way of example it will be considered that the analysis function is not co-located with the communication path end router.

FIG. 1 presents a communication path selection system. The operator deploys an interconnection network 50 to which are connected at least two communication path end routers 30, 130. The terminal 10 connects through an access network 90 to a communication path end router 30. The remote appliance 70, with which the terminal 10 establishes a session 40, is itself connected to a communication path end router 130 through an access network 190 which may either be the same as the access network to which the terminal is attached, or a different access network, of the same technology as or of a different technology from the access network of the terminal. By way of example, the access network 90 to which a terminal connects may be an ADSL network while the access network 190 of the remote appliance is a GPRS network. The interconnection network 50 of the end routers 30 may for example be an IP/MPLS infrastructure making it possible to convey the various flows of the clients, connected to access networks 90 or 190 of mobile type or of fixed type.

Between the terminal 10 and the remote appliance 70 is situated at least one communication path management device 20, 120 which will intervene in regard to the choice of the communication path 80. At least one path management device must necessarily be situated between the terminal 10 and the remote appliance 70, in order that the management method can be implemented.

The communication paths 80-1 80-2 80-3 established between two end routers (30, 130) within the interconnection network 50 may for example be IP-in-IP tunnels, GRE tunnels, IPSEC tunnels or tunnels of LSP type if the interconnection network involved is of IP/MPLS type. Knowing that the communication path must take account of the characteristics emitted by the terminal 10 and the remote appliance 70, the communication paths may for example be TE-LSPs, that is to say tunnels routed as a function, in this invention, of constraints transmitted via the signaling messages emitted by the appliances in charge of dispatching these messages.

FIG. 2 describes the various steps of the management method according to one aspect of the invention.

On startup of the service, that is to say when the client connects for example to a Web service in order to watch a video, listen to an audio service or access a text-type data service, their terminal during a step E1 initiates a session 40 with a remote appliance 70.

The choice of the end router 30 to which the terminal 10 connects in order to establish the session may depend on the characteristics of said session 40. For example it is envisaged that for certain destinations (according to the service provider or the destination domain, etc.), a specific end router 30 is selected.

The communication path management device 20 situated on the session's data path examines the parameters of the session so as to qualify said session during a step E2. The analysis function is either located in a specific appliance then mainly hosting this function, or located in an intermediate appliance such as a firewall, DPI (Deep Packet Inspection) appliance, a flows optimization appliance, or indeed in an end router 30. It is also possible for several communication path management devices 20 to be present on the data path, in which case each of the devices will perform the functions such as are presented hereinafter. In order that the selection of the communication path 80 can be activated, at least one communication path management device is necessary on the data path between the terminal 10 and the remote appliance 70. This communication path management device 20, on the basis of the session parameters 40, determines during a step E3 whether said session 40 is of collaborative type, that is to say whether it will be able to benefit from the dynamic routing function described in this invention. The parameters taken into account to qualify the eligibility of the session 40 for dynamic routing are specific to the architectures implemented by the operators. By way of example, the type of terminal 10, the domain of the session's recipient server, the IP address of the remote appliance 70 will be able to be analyzed and taken into account to determine that the session 40 is collaborative.

Thus, in the case where the session 40 is not considered to be collaborative, no specific action is implemented and the flows are routed over the operator's interconnection network in accordance with the so-called conventional forwarding rules during a step E31, based on the information of the IP layer and the analysis of the information of quality of service of the datagram and especially of the Diffsery information if these are taken into account in the operator's architecture, in accordance with what is used in the prior art.

If the session 40 is identified as collaborative by the communication path management device 20 during step E3 because one of the parameters or several parameters analyzed by the communication path management device 20 correspond to such a session 40, then the communication path management device 20 will be able to emit a collaborative-session initialization message during a step E4 bound for the terminal 10 and the remote appliance 70. Step E32 comprises the various steps intervening in the method when the session is identified as collaborative, namely steps E4 up to E9.

On receipt of the initialization message dispatched by the communication path management device 20, the terminal 10 as well as the remote appliance 70 are informed that the session initiated is of collaborative type.

These initialization messages are considered to be optional. Indeed, another mode of implementation of the method can consist in the session end appliances and intermediate appliances on the data path emitting signaling messages in the absence of initialization messages, knowing that these messages will or will not be taken into account depending on whether the session benefits from the method or not. It is indeed possible to envisage that all the terminals connecting to a mobile network benefit from the method, in which case it would be unnecessary to systematically indicate to them that the sessions that they establish are beneficiaries of the method.

Each communication path management device 20 present on the data path acts in this way and transmits an initialization message, these messages transmitting the same item of information to the terminal and the remote appliance since the various communication path management devices 20 are configured according to a consistent management policy by the operator. The end appliances of the session, the terminal 10 and the remote appliance 70, just like the communication path end routers 30 that have intercepted the initialization messages, dispatch a signaling message during a step E5, the object of which is to select the communication path best adapted to the parameters of the initialized session.

The dispatching of the signaling messages is performed on receipt of the initialization message received from the appliance supporting the analysis function, or else by default if the initialization messages are not used in the method. When a session has been identified as of collaborative type according to step E3 of the method, the terminal 10 and the remote appliance 70, just like the communication path 80 end routers 30, will be able to dispatch signaling messages at regular intervals, including if the session characteristics are not modified and do not require a priori any updating of the communication path 80. In a concern for optimization, it may also be envisaged that these appliances transmit new signaling messages only when session characteristics evolve and are therefore liable to bring about a change of communication path 80, so as to ensure a transfer of data meeting the criteria of quality of service corresponding to the new session characteristics. In this case the session data for which a new signaling message has been emitted by an appliance will be routed in an existing communication path 80 or a path to be created if none of the existing paths 80 affords a quality of service adapted to the characteristics of the session. Another option, if for example it is not possible to create a new communication path, is to modify the existing path 80 so that its characteristics are adapted to the parameters of said session.

On the basis of at least one signaling message received, the communication path management device 20 determines connection parameters during a step E6 making it possible to select the communication path 80 adapted to the characteristics of the session 40. To determine the connection parameters, the communication path management device 20 uses for example a database with the help of which it can associate session characteristics 40 with connection parameters.

In a step E7, the communication path management device 20 transmits the connection parameters to the end router 30 in charge of forwarding the data of the session in the interconnection network 50. In order to transmit the connection parameters to the end router 30, the communication path management device 20 can use a specific protocol, for example Netconf (Network Configuration Manager) or SNMP (Simple Network Management Protocol). It can also transmit the connection parameters information via a protocol used for other purposes, for example a routing protocol, such as OSPF (Open Short Path First) or BGP (Border Gateway Protocol). In an environment where SDN (Software Defined Networks) technologies are used, the transmission of the connection parameters to the end routers 30 can take place on the basis of a Network Controller or indeed on the basis of an orchestrator. On the basis of the connection parameters received from the communication path management device 20, the end router 30 selects the communication path 80. The end router 30 can use a database within which the various communication paths 80 established in the interconnection network 50 are cataloged, as are also the characteristics of these various paths. Thus, said router 30 is able to select the path 80 whose characteristics correspond to the connection parameters received. In the case where no path 80 in place exhibits characteristics corresponding to the connection parameters received, the end router 30 creates a new communication path 80 having characteristics corresponding to the connection parameters transmitted by the communication path management device 20 and updates its database with the new path 80 created and the characteristics of this said new path 80, doing so in order that the end router 30 can use this tunnel for other sessions for which signaling messages will have led to determining connection parameters corresponding to the characteristics of said new path. If for any reason, the end router cannot create a new path, or if the option adopted by the operator is not to create a new path in the case where none is suitable, a modification of existing path 80 is also possible and furthermore requires an updating of the database with these new characteristics.

Once the communication path 80 has been selected, the end router 30 transmits the data of the session on the new selected path 80. In the case where the data of a single session 40 are transmitted on just one communication path 80, the communication path 80 is specific to a given session 40. In the case where several sessions 40 use one and the same communication path 80, the data of these sessions are multiplexed by said end router 30 on the communication path 80. This multiplexing intervenes equally well on initialization of the session as when the session is established if for example a new communication path 80 already used for other sessions 40 must be used for an ongoing session 40.

Another implementation option consists in the flows of a session 40 being forwarded on several communication paths 80. In this case, the end router 30 routes the flow of the session 40 on several paths 80, the choice of the paths 80 being under the responsibility of the end router 30.

FIG. 3 presents the various exchanges between various entities of the system allowing the implementation of the method and corresponding to the steps described in FIG. 2. In this embodiment, the communication paths are implemented by the operator between PE (Provider Edge) end routers and are MPLS tunnels of LSP (Label Switch Path) type. The updates of these tunnels as a function of quality-of-service criteria are carried out on the basis of the SPUD protocol, a protocol for a session between a terminal and a server (or another terminal) atop which the application sessions are established.

A given session is supported by a SPUD tube, that is to say a path characteristic of a SPUD session, characterized by the following parameters:

SPUD session identifier (SPUD-session-ID)

Browser identifier (Browser-ID)

Software identifier (Payer-ID)

Terminal identifier (Terminal-ID)

Type of Terminal (Terminal-type)

Source IP address of the terminal (@IP terminal)

Destination IP address of the server (@IP server)

Server identifier (Server-ID)

Table 1 presents an example of characteristics of SPUD tubes, comprising the type of terminal initiating the session, the activated service requiring the implementation of a session, the constraints of the SPUD tube and more precisely the intermediate IP addresses of the tube as well as the service provider.

TABLE 1

| SPUD tube characteristics | | | | |
|---|---|---|---|---|
| | Terminal | Service | Constraints | Recipient service provider |
| SPUD 1 | Android | Video | none | @Youtube |
| SPUD 2 | PC | Video | @IP1, @IP2 | @Youtube |
| SPUD 3 | PC | Video | @IP3 | @Dailymotion |

As a function of the parameters of the SPUD tube, the latter is routed to a tunnel end router also called PE. The selection of a PE from among the set of PEs managed by the operator is carried out as a function of the parameters of the SPUD tube and is specific to the operator's engineering. For example, the operator may take into account the destination IP address of the session or the type of service in order to route the SPUD tube to a specific router. It may also take no parameter into account and route the SPUD tube to a default router or one selected as a function of the routing activated on the access network.

An http (hypertext transfer protocol) session is established during a step E1 between a terminal 10 and a server 70, this session relying on a SPUD session. A communication path management device 20 situated on the data path of the session examines the parameters of the SPUD session, the support of the http session, so as to qualify said session during a step E2.

At least one communication path management device 20, on the basis of the SPUD session parameters, determines whether the SPUD session is of collaborative type during a step E3, that is to say whether it will be able to benefit from the path management described in this invention.

With reference to the parameters of table 1, it is considered that the operator wishes the Dailymotion flows to benefit from the dynamic path selection, thereby implying that the tube SPUD3 will be routed in a tunnel corresponding to the characteristics of this tube while the other tubes (SPUD 1 and SPUD 2) are not impacted by the method.

A collaborative-session initialization message (SPUD Hello) is dispatched during a step E4 to the terminal 10 and the remote appliance 70 if the session is identified as collaborative. The method does not necessarily require the dispatching of possibly optional messages of SPUD Hello type.

In a more complete approach, the SPUD Hello message will be able to indicate requirements in terms of characteristics of SPUD signaling message to be integrated by the terminal 10, the server 70 and the appliances placed on the data path being able to emit SPUD signaling messages on receipt of the initialization message.

The communication path management device 20 relies on a database making it possible to assess the collaborative character by comparing the parameters of the SPUD session with the content of the database.

On receipt of the SPUD Hello message dispatched by the communication path management device 20, both the terminal 10 and the server 70 are informed that the initiated session is of collaborative type.

The end appliances of the session, the terminal 10 and the server 70 just like the communication path end routers 30 and 130 having intercepted the SPUD Hello messages dispatch a SPUD signaling message (SPUD advice) during a step E5 the object of which is to select the LSP tunnel best adapted to the parameters of the initialized SPUD session.

The characteristics of the SPUD signaling messages are described in table 2 by way of example:

TABLE 2

SPUD signaling messages

| | Memory buffering-ratio | Encoding rate | Time of startup | Type of protocol | Geo Location | Tube |
|---|---|---|---|---|---|---|
| Advice 1 | <5% | 500 kbps | 1 s | Video | FR | SPUD 1 |
| Advice 2 | >5% | 1 Mb | 2 s | Video | FR | SPUD 2 |
| Advice 3 | >5% | 1 Mb | 2 s | Video | FR | SPUD 3 |

In the SPUD signaling messages described in table 2, in the case where the reader side memory buffering ratio increases by more than 5%, a new message (Advice3) of the tube SPUD1 must be generated that could lead to the updating of the communication path, therefore to recourse to another LSP tunnel in the present case, so as to maintain the quality of service for the client. By way of example, table 3 presents connection parameters defined by the communication path management device 20 on the basis of the session characteristics emitted in the SPUD signaling messages and which will be able to be interpreted by the PE routers for the selection of the LSP tunnel and the transmission of the data of the session in the LSP tunnel.

TABLE 3

Connection parameters

| | Bandwidth required | Quality of Service | Lag | IP protocol version |
|---|---|---|---|---|
| SPUD 1 | 10M | AF | 100 ms | IPv4 |
| SPUD 2 | 3M | EF | 300 ms | IPv6 |

Table 4 presents a list of MPLS tunnels together with their characteristics and their network constraints, by way of example.

TABLE 4

Characteristics of the tunnels

| | Destination address | Class | Total bandwidth | Lag | Useful bandwidth | Direction | Bandwidth remaining |
|---|---|---|---|---|---|---|---|
| Tunnel 1 | 1.1.1.1 | EF | 100M | 10 ms | 80M | uni | 20M |
| Tunnel 2 | 2.2.2.2 | AF | 70M | 100 ms | 65M | blr | 5M |
| Tunnel 3 | 3.3.3.3 | EF | 500M | 5 ms | 100M | blr | 400M |

The description of the network constraints is presented in table 5, by way of example:

TABLE 5

Routing of the SPUD tubes in the MPLS tunnels

| Traffic | | PE | | Traffic | | PE |
|---|---|---|---|---|---|---|
| SPUD 1 | Tunnel 1 | Address PE1 | → | SPUD 2 | Tunnel 2 | Address PE2 |
| SPUD 2 | Tunnel 2 | Address PE2 | | SPUD 1 | Tunnel 3 | Address PE1 |

On the basis of at least one message received, the communication path management device 20 determines connection parameters during a step E6 making it possible to select the IP/MPLS tunnel corresponding to the characteristics of the session.

In a step E7, the communication path management device 20 transmits the connection parameters to the PE router 30 in charge of forwarding the data of the session in the IP/MPLS network 50.

On the basis of the connection parameters received from the communication path management device 20, the PE 30 selects at least one IP/MPLS tunnel 80 during a step E8 by virtue of a database within which the various IP/MPLS tunnels 80 together with their characteristics are cataloged.

Once the IP/MPLS tunnel 80 has been selected, the PE 30 transmits the data of the session in the at least one tunnel selected if required by using the multiplexing techniques, during a step E9.

The implementation of the method described by way of example for the PE 30 and the communication path device 20 also applies for the PE 130 and the management device 120, the PE 130 and the device 120 having the respective roles of the PE 30 and of the device 20 in the implementation of the method.

In conjunction with FIG. 4, an exemplary structure of a communication path management device, according to one aspect of the invention is now presented.

The communication path management device 20 implements the communication path management method, various embodiments of which have just been described.

Such a device 20 can be implemented in end router 30.

The communication path management device 120 exhibits the same structure as the device 20 and can be implemented in the end router 130.

For example, the device 20 comprises a processing unit 230, equipped for example with a microprocessor µP, and driven by a computer program 210, stored in a memory 220 and implementing the authorization method according to the invention. On initialization, the code instructions of the computer program 210 are for example loaded into a RAM memory, before being executed by the processor of the processing unit 230.

Such a device 20 comprises the following modules:

An analysis module 204 for analyzing the established sessions, designed to determine whether a session is of collaborative type and to trigger, if such is the case, the dispatching of initialization messages if the option is actually adopted, An emission module 202 designed to emit the connection parameters to the communication path end routers 30, A reception module 201, designed to receive signaling messages on the basis of which the communication path management device 20 defines the connection parameters, A determination module 205 for determining the connection parameters designed to determine the connection parameters on the basis of the signaling messages received from appliances on the communication path, which will be transmitted to the end router 30, A database 206 designed to associate session characteristics transmitted in the signaling messages with connection parameters.

Optionally, in another embodiment, the communication path management device 20 furthermore comprises an initialization module 203 designed to define the characteristics required by the appliances as a function of the initialization messages and designed to create initialization messages. In this option, the emission module 202 is furthermore designed to emit the initialization messages destined for the terminal 10 and for the remote appliance 70.

The module described in conjunction with FIG. 4 may be a hardware or software module.

The exemplary embodiments of the invention which have just been presented are merely a few of the conceivable embodiments.

It is recalled that, according to the prior art, application sessions are being maintained for ever longer durations without disconnection. The tunnels administered by network operators and conveying these sessions are implemented on initialization of these sessions and are not updated during a session, even if the application requirements vary. Thus, if the characteristics of the application sessions require an updating of the tunnels in terms of lag, bandwidth, quality of service, it is not possible to dynamically modify these tunnels, if tunnels are actually involved, or else the routes if the operator's infrastructure is based on routing techniques.

In contradistinction to this prior art, the invention makes it possible to afford a solution to this problem by enabling, via the implementation of at least one tunnel management device or to be more generic path management device, the updating of the tunnels supporting the transport of the session data, by modifying an existing tunnel, by creating a new tunnel, or by dispatching the data on several tunnels knowing that the tunnels in question can support several sessions simultaneously. This invention can also be implemented in the case where the infrastructure is not based on tunnels but on IP routing techniques or indeed on OSI level 2 links such as virtual circuits, or indeed links leased in an environment or the functions related to setting up these paths (tunnels, virtual circuits, leased links). Moreover, the path management device according to the invention can be instantiated in a physical appliance or deployed in the form of a virtualized function.

The invention claimed is:

1. A method for managing at least one communication path between a first router (30) and a second router (130), the communication path comprising a communication path management device and the method being characterized in that it comprises the following steps:
    establishment of a session (40) between a terminal (10) connected to the first router (30) and a remote appliance (70) connected to the second router (130) through the at least one communication path,
    analysis of at least one characteristic, among which are a service provider, the type of the terminal, the type of a browser or the identity of a client, of the established session (40)
    in response the at least one characteristic corresponding to a session being eligible for dynamic management of the at least one communication path, dispatch collaborative-session initialization messages to the terminal and the remote appliance,
    reception from the first router or the second router or from the terminal or the remote appliance of at least one signaling message invoked by the initialization messages, the signaling message comprising at least one item of information relating to a characteristic of said session (40),
    determination of parameters of connection between said routers (30, 130) as a function of the at least one item of information obtained,
    modification of the at least one communication path (80) between said routers (30, 130) as a function of the connection parameters determined,
    transmission of the data of said session (40) in said modified communication path (80).

2. The management method as claimed in claim 1, where the step of establishing the session (40) comprises a step of analyzing said session for the selection of said first router (30) to which the terminal (10) connects.

3. The management method, as claimed in claim 1, comprising a step of communication path selection (80), from among previously established paths, whose characteristics correspond to the connection parameters, as a function of said connection parameters.

4. The management method, as claimed in claim 1, comprising a step of establishment of communication path (80) with the characteristics corresponding to the connection parameters, in the case where no previously established path corresponds to said connection parameters.

5. The management method, as claimed in claim 3, furthermore comprising a step of multiplexing the data of said session (40) with data of at least one other session in a communication path (80).

6. The management method as claimed in claim 3, furthermore comprising a step of transmitting the data of said session (40) on at least two communication paths.

7. A communication path management device (20, 120), deployed between the terminal (10) and the first end router (30) or between the remote appliance (70) and the second end router (130), said device comprising:
    an analyzer (204) of at least one characteristic, among which are a service provider, the type of the terminal, the type of a browser or the identity of a client, of a session (40) established between the terminal (10) and the remote appliance (70) through at least one communication path, the communication path including the communication path management device,
    a dispatcher, in response the at least one characteristic corresponding to a session being eligible for dynamic management of the at least one communication path, to dispatch collaborative-session initialization messages to the terminal and the remote appliance,
    a generator of collaborative-session initialization messages (203) bound for the terminal (10) and the remote appliance (70) if said session (40) is collaborative,
    a receiver (201) of the signaling messages related to said session invoked by the initialization messages,
    a module (205) for determining the parameters of connection between said routers as a function of the at least one item of information obtained in at least one signaling message received by the receiver from the first end router or the second end router or from the terminal or the remote appliance,
    an emitter (202) of the connection parameters to the communication path (80) end router (30).

8. The management device (20, 120), as claimed in claim 7, characterized in that it is embedded in a communication path end router (30, 130).

9. A communication path management system comprising:
    at least one communication path management device (20, 120), deployed between the terminal (10) and the first end router (30) or between the remote appliance (70) and the second end router (130), said device comprising:
        an analyzer (204) of at least one characteristic, among which are a service provider, the type of the terminal, the type of a browser or the identity of a client, of a session (40) established between the terminal (10) and the remote appliance (70) through at least one communication path, the communication path including the communication path management device, a dispatcher, in response the at least one characteristic corresponding to a session being eligible for dynamic management of the at least one communication path, to dispatch collaborative-session initialization messages to the terminal and the remote appliance, a generator of collaborative-session initialization messages (203) bound for the terminal (10) and the remote appliance (70) if said session (40) is collaborative, a receiver (201) of the signaling messages related to said session invoked by the initialization messages, a module (205) for determining the parameters of connection between said routers as a function of the at least one item of information obtained in at least one signaling message received by the receiver from the first end router or the second end router or from the terminal or the remote appliance, an emitter (202) of the connection parameters to the communication path (80) end router (30);

at least two communication path end routers (30, 130):

a database (303) describing the communication paths (80) established with other end routers (30) and characteristics of said communication paths, a receiver (301) of the connection parameters of an established session between a terminal and a remote appliance emitted by the communication path management device, a module (302) for selecting the communication path as a function of said connection parameters.

10. A non-transitory computer-readable medium storing a communication path management program comprising instructions for execution by a processor of a communication path management device for implementation of steps of a management method for managing at least one communication path between a first router (30) and a second router (130), the communication path including the communication path management device, the management method comprising:

establishment of a session (40) between a terminal (10) connected to the first router (30) and a remote appliance (70) connected to the second router (130) through the at least one communication path, analysis of at least one characteristic, among which are a service provider, the type of the terminal, the type of a browser or the identity of a client, of the established session (40)

in response the at least one characteristic corresponding to a session being eligible for dynamic management of the at least one communication path, dispatch collaborative-session initialization messages to the terminal and the remote appliance, reception by the communication path management device from the first or the second router or from the terminal or the remote appliance of at least one signaling message invoked by the initialization messages, the signaling message comprising at least one item of information relating to a characteristic of said session (40), determination of parameters of connection between said routers (30, 130) as a function of the at least one item of information obtained, modification of the at least one communication path (80) between said routers (30, 130) as a function of the connection parameters determined, transmission of the data of said session (40) in said modified communication path (80).

11. A non-transitory recording medium readable by a communication path management device (20) or an end router (30, 130) on which a communication path management program is recorded, the communication path management program comprising instructions for execution by a processor for implementation of steps of a management method for managing at least one communication path between a first router (30) and a second router (130), the communication path including the communication path management device, the management method comprising:

establishment of a session (40) between a terminal (10) connected to the first router (30) and a remote appliance (70) connected to the second router (130) through the at least one communication path, analysis of at least one characteristic, among which are a service provider, the type of the terminal, the type of a browser or the identity of a client, of the established session (40)

in response the at least one characteristic corresponding to a session being eligible for dynamic management of the at least one communication path, dispatch collaborative-session initialization messages to the terminal and the remote appliance, reception by the communication path management device from the first or the second router or from the terminal or the remote appliance of at least one signaling message invoked by the initialization messages, the signaling message comprising at least one item of information relating to a characteristic of said session (40), determination of parameters of connection between said routers (30, 130) as a function of the at least one item of information obtained, modification of the at least one communication path (80) between said routers (30, 130) as a function of the connection parameters determined, transmission of the data of said session (40) in said modified communication path (80).

12. The management method as claimed in claim 2 furthermore comprising a step of dispatching collaborative-session initialization messages to the terminal (10) and the remote appliance (70) if the session is collaborative.

13. The management method, as claimed in claim 2, comprising a step of communication path selection (80), from among previously established paths, whose characteristics correspond to the connection parameters, as a function of said connection parameters.

14. The management method, as claimed in claim 1, comprising a step of communication path selection (80), from among previously established paths, whose characteristics correspond to the connection parameters, as a function of said connection parameters.

15. The management method, as claimed in claim 2, comprising a step of establishment of communication path (80) with the characteristics corresponding to the connection parameters, in the case where no previously established path corresponds to said connection parameters.

16. The management method, as claimed in claim 1, comprising a step of establishment of communication path (80) with the characteristics corresponding to the connection parameters, in the case where no previously established path corresponds to said connection parameters.

17. The management method, as claimed in claim 4, furthermore comprising a step of multiplexing the data of said session (40) with data of at least one other session in a communication path (80).

18. The management method as claimed in claim 4, furthermore comprising a step of transmitting the data of said session (40) on at least two communication paths.

19. The management method as claimed in claim 5, furthermore comprising a step of transmitting the data of said session (40) on at least two communication paths.

20. The management device (20, 120), as claimed in claim 7, characterized in that it is embedded in a communication path end router (30, 130).

* * * * *